US008825713B2

(12) United States Patent
Guizar

(10) Patent No.: US 8,825,713 B2
(45) Date of Patent: Sep. 2, 2014

(54) BPM SYSTEM PORTABLE ACROSS DATABASES

(75) Inventor: Alejandro Guizar, Houston, TX (US)

(73) Assignee: Red Hat, Inc., Raleigh, NC (US)

( * ) Notice: Subject to any disclaimer, the term of this patent is extended or adjusted under 35 U.S.C. 154(b) by 410 days.

(21) Appl. No.: 11/900,740

(22) Filed: Sep. 12, 2007

(65) Prior Publication Data

US 2009/0070362 A1 Mar. 12, 2009

(51) Int. Cl.
*G06F 17/30* (2006.01)

(52) U.S. Cl.
CPC .............................. *G06F 17/30557* (2013.01)
USPC ..................................................... 707/803

(58) Field of Classification Search
None
See application file for complete search history.

(56) References Cited

U.S. PATENT DOCUMENTS

| | | | |
|---|---|---|---|
| 5,809,297 A * | 9/1998 | Kroenke et al. ........................ | 1/1 |
| 6,038,566 A * | 3/2000 | Tsai ...................................... | 1/1 |
| 6,356,913 B1 * | 3/2002 | Chu et al. ............................. | 1/1 |
| 6,654,748 B1 * | 11/2003 | Rabung et al. ................. | 709/203 |
| 7,069,553 B2 | 6/2006 | Narayanaswamy et al. | |
| 7,131,123 B2 | 10/2006 | Suorsa et al. | |
| 7,151,744 B2 | 12/2006 | Sarkinen et al. | |
| 7,231,267 B2 | 6/2007 | Boumas et al. | |
| 7,246,358 B2 | 7/2007 | Chinnici et al. | |
| 7,284,039 B2 | 10/2007 | Berkland et al. | |
| 7,290,258 B2 | 10/2007 | Steeb et al. | |
| 7,322,031 B2 | 1/2008 | Davis et al. | |
| 7,454,492 B2 | 11/2008 | Bauer et al. | |
| 7,487,513 B1 | 2/2009 | Savchenko et al. | |
| 7,519,972 B2 | 4/2009 | Carr et al. | |
| 7,577,964 B2 | 8/2009 | Beringer et al. | |
| 7,647,392 B2 | 1/2010 | Sharma et al. | |
| 7,665,085 B2 | 2/2010 | Sundararajan et al. | |
| 7,694,140 B1 | 4/2010 | Sachenko et al. | |
| 7,770,151 B2 | 8/2010 | Sanjar et al. | |
| 7,822,826 B1 | 10/2010 | Savchenko et al. | |
| 7,822,860 B2 | 10/2010 | Brown et al. | |
| 7,836,441 B2 | 11/2010 | Chen et al. | |
| 7,856,631 B2 | 12/2010 | Brodkorb et al. | |
| 7,861,243 B2 | 12/2010 | Narayanaswamy et al. | |
| 7,890,956 B2 | 2/2011 | Angelov et al. | |
| 7,908,294 B2 | 3/2011 | Ansari | |
| 8,423,955 B2 | 4/2013 | Baeyens et al. | |
| 2002/0178254 A1 | 11/2002 | Brittenham et al. | |
| 2002/0178394 A1 * | 11/2002 | Bamberger et al. ................ | 714/1 |
| 2003/0050932 A1 | 3/2003 | Pace et al. | |
| 2003/0078934 A1 * | 4/2003 | Cappellucci et al. .......... | 707/101 |
| 2003/0225757 A1 * | 12/2003 | Evans et al. ........................ | 707/3 |
| 2004/0034669 A1 * | 2/2004 | Smith et al. .................... | 707/201 |
| 2004/0039748 A1 * | 2/2004 | Jordan et al. ................... | 707/101 |
| 2004/0128622 A1 | 7/2004 | Mountain et al. | |
| 2004/0133876 A1 * | 7/2004 | Sproule .......................... | 717/105 |

(Continued)

OTHER PUBLICATIONS

Abstraction Layer as of Aug. 2, 2007 http://en.wikipedia.org/w/index.php?title=Abstraction_layer&oldid=148731044.*

(Continued)

*Primary Examiner* — Kevin L Young
(74) *Attorney, Agent, or Firm* — Lowenstein Sandler LLP

(57) ABSTRACT

A business process management (BPM) system operable with various database types. The BPM system may include a BPM process engine to execute business processes and request database access during execution, and a database module to access a database having one or more unique features that are inapplicable to other database types supported by the BPM system.

8 Claims, 5 Drawing Sheets

(56) References Cited

U.S. PATENT DOCUMENTS

| | | | |
|---|---|---|---|
| 2004/0177335 | A1 | 9/2004 | Beisiegel et al. |
| 2004/0177352 | A1 | 9/2004 | Narayanaswamy et al. |
| 2005/0071243 | A1 | 3/2005 | Somasekaran et al. |
| 2005/0114771 | A1 | 5/2005 | Piehler et al. |
| 2005/0165932 | A1 | 7/2005 | Banerjee et al. |
| 2005/0204354 | A1 | 9/2005 | Sundararajan et al. |
| 2005/0234890 | A1* | 10/2005 | Enzler et al. ............. 707/3 |
| 2005/0251468 | A1* | 11/2005 | Eder ............. 705/35 |
| 2005/0283837 | A1 | 12/2005 | Olivier et al. |
| 2006/0004783 | A1* | 1/2006 | Carr et al. ............. 707/100 |
| 2006/0212846 | A1* | 9/2006 | O'Farrell et al. ............. 717/116 |
| 2007/0011322 | A1 | 1/2007 | Moiso |
| 2007/0174317 | A1* | 7/2007 | Bangel et al. ............. 707/101 |
| 2007/0214113 | A1* | 9/2007 | Lei et al. ............. 707/3 |
| 2007/0219971 | A1* | 9/2007 | Biermann et al. ............. 707/3 |
| 2007/0226196 | A1* | 9/2007 | Adya et al. ............. 707/3 |
| 2007/0226233 | A1* | 9/2007 | Walter et al. ............. 707/100 |
| 2007/0240127 | A1 | 10/2007 | Roques et al. |
| 2007/0250575 | A1 | 10/2007 | Tseitlin et al. |
| 2007/0260629 | A1 | 11/2007 | Tseitlin et al. |
| 2007/0280111 | A1 | 12/2007 | Lund |
| 2008/0255997 | A1* | 10/2008 | Bluhm et al. ............. 705/80 |
| 2009/0063225 | A1 | 3/2009 | Baeyens et al. |
| 2009/0064104 | A1 | 3/2009 | Baeyens et al. |
| 2009/0070764 | A1 | 3/2009 | Guizar et al. |
| 2009/0144729 | A1 | 6/2009 | Guizar et al. |
| 2009/0183150 | A1 | 7/2009 | Felts |
| 2010/0235445 | A1* | 9/2010 | Palmeri et al. ............. 709/204 |

OTHER PUBLICATIONS

SYBASE Chapter, First Edition : SYBASE Data Types http://www.okstate.edu/sas/v8/sashtml/accdb/z0439559.htm accessed Mar. 4, 2013.*

PostgreSQL: Documentation: 8.4: Data Types http://www.postgresql.org/docs/8.4/static/datatype.html accessed Mar. 4, 2013.*

Oracle Datatypes http://docs.oracle.com/cd/B19306_01/server.102/b14200/sql_elements00 accessed Mar. 4, 2013.*

Atenzi et al. Model-Independent Schema and Data translation, EDBT 2006.*

"jbpm-bpel-1.0-alpha1," jBPM.org Files on SourceForge.net, Jun. 1, 2005. 44 pages.

"jbpm-bpel-1.0-alpha2," jBPM.org Files on SourceForge.net, Jun. 24, 2005, 41 pages.

"jbpm-bpel-1.0-alpha3," jBPM.org Files on SourceForge.net, Sep. 6, 2005, 51 pages.

"jbpm-bpel-1.0-alpha4," jBPM.org Files on SourceForge.net, Dec. 26, 2005, 55 pages.

"jbpm-bpel-1.1-beta1," jBPM.org Files on SourceForge.net, Jun. 11, 2006, 58 pages.

Websphere Message Broker Manual, publib.boulder.ibm.com/infocenter/wmbhelp/v6r0m0/index.jsp, Sep. 30, 2005.

Red Hat Office Action for U.S. Appl. No. 11/897,910, mailed Feb. 2, 2011.

Red Hat Office Action for U.S. Appl. No. 11/900,707, mailed May 13, 2011.

IBM Websphere Application Server 5.1 Documentation, "Develop Web service deployment descriptor templates from the WSDL file", Version 5, Release 3, Oct. 4, 2005. publib.boulder.ibm.com/infocenter/iseries/v5r3/index.jsp?topic=%2Frzatz%2Fwebserv%2Fwsdevddtemp.htm.

IBM Websphere 6 Documentation, "WebSphere MQ custom properties" Sep. 2, 2006. publib.boulder.ibm.com/infocenter/wasinfo/v6r1/index.jsp?topic=%2Fcom.ibm.websphere.base.doc%2Finfo%2Faes%2Fcmm_customprops.html.

IBM WebSphere 6 Documentation, "Publish/subscribe messaging example using remote publication points," Oct. 5, 2005. publib.boulder.ibm.com/infocenter/dmndhelp/v6rxmx/index.jsp?topic=/com.ibm.websphere.pmc.nd.doc/conceptscjo_remote_pubsub.html.

Koenig, John, "JBoss jBPM," White Paper, www.riseforth.com, Nov. 2004. 10 pages.

Sun Microsystems, "Java2 Enterprise Edition Deployment API 1.1", 2002; [retrieved on Oct. 17, 2011]; Retrived from Internet <URL:http://java.sun.com/2ee/tools/deployment/88ChangeLog1/1-aug2802.html.;pp. 1-10.

Bea Systems, Inc. "Deploying WebLogic Platform Applications, Version 8.1 Service Pack 6", Jun. 2006. [retrieved on May 25, 2011]. Retrieved from Internet,URL:http://download.oracle.com/docs/cdE13196_01/platform/docs81/pdf/deploy.pdf>; pp. 1-172.

Office Action for U.S. Appl. No. 11/879,910, mailed Aug. 5, 2011.
Office Action for U.S. Appl. No. 11/897,910, mailed Nov. 18, 2011.
Office Action for U.S. Appl. No. 11/900,707, mailed Nov. 9, 2011.
Office Action for U.S. Appl. No. 11/998,508, mailed Sep. 8, 2011.
Office Action for U.S. Appl. No. 11/897,570, mailed Jun. 1, 2011.
Office Action for U.S. Appl. No. 11/897,570, mailed Oct. 24, 2011.

Apte, Ajay "IBM WebSphere Developer Technical Journal: System Administration for WebSphere Application Server V5, Part 6—Application Management," Sep. 10, 2003, 8 pages.

Baeyens, Tom, "The State of Workflow," Jboss, May 28, 2007, 14 pages. http://www.ibm.com/developerworks/websphere/techjournal/0309_apte/apte.html.

IBM Corp., WebSphere MQ Version 6.0—"System Administration Guide", Feb. 15, 2005.

IBM Corp., "iSeries WebSphere Application Server—Express Version 5.1", May 13, 2003.

Altentee, "Monitoring Queue Statistics in MQ," Apr. 30, 2007, altentee.com/blogs/2007/monitoring-queue-statistics-in-mq/.

Various Authors, "MQSeries.net:: View Topic—How can you keeping running total msgs per Queue for the day?," Aug. 26, 2005, www.mqseries.net/phpBB2/viewtopic.php?t=24005.

USPTO; Office Action for U.S. Appl. No. 11/900,707, mailed Apr. 25, 2012.

USPTO; Office Action for U.S. Appl. No. 11/998,508, mailed Jan. 13, 2012.

USPTO; Office Action for U.S. Appl. No. 11/897,910, mailed Mar. 19, 2012.

Houghton Mifflin Company, "The American Heritage College Dictionary", fourth edition; 2002; p. 441.

USPTO; Office Action for U.S. Appl. No. 11/897,910, mailed Aug. 8, 2012.

USPTO; Notice of Allowance for U.S. Appl. No. 11/897,910, mailed Dec. 18, 2012.

USPTO; Office Action for U.S. Appl. No. 11/900,707, mailed Nov. 7, 2012.

USPTO; Office Action for U.S. Appl. No. 11/998,508, mailed Dec. 31, 2012.

USPTO; Office Action for U.S. Appl. No. 11/897,570, mailed Sep. 28, 2012.

IBM, "Artifacts used to develop Web services based on Web Services for J2EE"; 2005, IBM online knowledge base; [retrieved on Jan. 26, 2013]; retrieved from Internet <URL:http://publib.boulder.ibm.com/infocenter/adiehelp/v5rlm1/topic/com.ibm.wasee.doc/ino/e . . . >; pp. 1-2.

Flurry et al., "The IBM Application Framework for e-business", 2001, IBM Systems Journal; [retrieved from Internet <URL:http://www.zota.ase.ro/eb/flurry.pdf>; pp. 8-24.

USPTO; Office Action for U.S. Appl. No. 11/897,570, mailed Jan. 29, 2013.

USPTO; Office Action for U.S. Appl. No. 11/897,570, mailed May 17, 2013.

USPTO; Office Action for U.S. Appl. No. 11/998,508, mailed May 7, 2013.

White, et al. "Automated Model-Based Configuration of Enterprise Java Applications"; 2007 IEEE [retrieved on Sep. 6, 2013]; Retrieved from internet <URL:ftp://icm.linuxberg.com/packages/ace/ACE/PDF/white-automated.pdf>; pp. 1-12.

Unknown Author, "Help—WebSphere MQ", Aug. 17, 2005, publib.boulder.ibm.com/infocenter/wmqv6/v6r0/index.jsp?topic=%2Fcom.ibm.mq.amqtac.doc%2Fwq10160_.htm, tasks 5 and 16.

USPTO; Office Action for U.S. Appl. No. 11/897,570, mailed Oct. 4, 2013.

USPTO; Office Action for U.S. Appl. No. 11/900,707, mailed Oct. 7, 2013.

USPTO; Office Action for U.S. Appl. No. 11/998,508, mailed Sep. 10, 2013.

Red Hat Office Action for U.S. Appl. No. 11/998,508, mailed Jan. 7, 2014.

Red Hat Office Action for U.S. Appl. No. 11/897,570, mailed Feb. 18, 2014.

* cited by examiner

BPM SYSTEM PORTABLE ACROSS DATABASES

TECHNICAL FIELD

Embodiments of the present invention relate to business process management (BPM), and more specifically to providing a BPM system portable across different databases.

BACKGROUND

Business process management (BPM) offers a programmatic structure for designing transactions and executing them using automated decisions, tasks and sequence flows. For example, an insurance company can use BPM to automate the steps involved in processing insurance claims. A BPM system typically includes an engine that executes process definitions, and tools that aid process development and monitoring.

A typical BPM system is operable with a limited number of databases that support the same data types and the same properties of data elements. For example, jBPM, a tool used by jBoss division of Red Hat Inc., is operable with the HSQL database and MySQL database but not with other databases that support different data types or different data element properties. This creates inconvenience and extra expenses for customers who either have to replace their existing database product or find a BPM system that is operable with their existing database.

BRIEF DESCRIPTION OF THE DRAWINGS

The present invention is illustrated by way of example, and not by way of limitation, and can be more fully understood with reference to the following detailed description when considered in connection with the figures in which.

DETAILED DESCRIPTION

Figure 1:
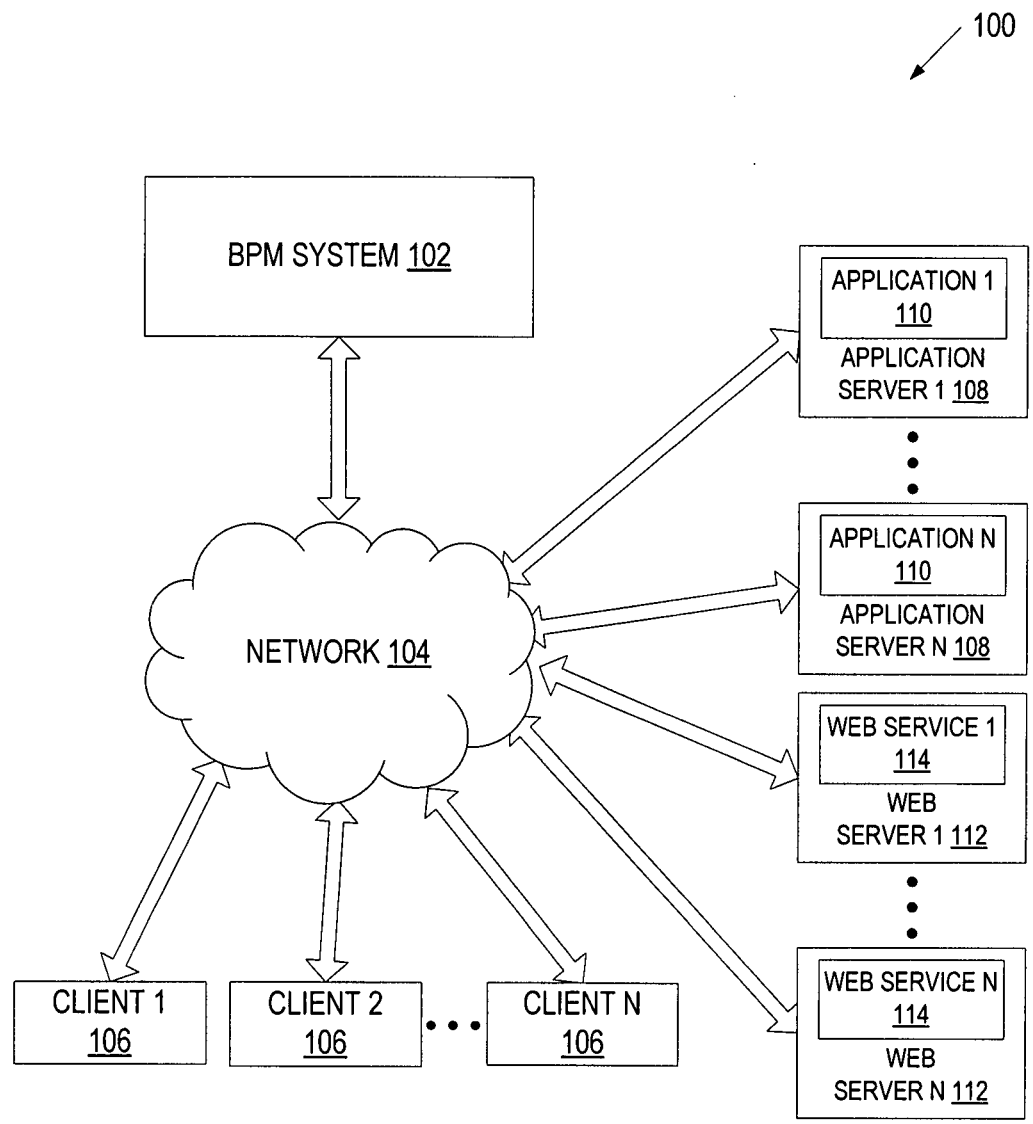
FIG. 1 illustrates an exemplary network architecture in which embodiments of the invention may operate.

Described herein is a business process management (BPM) system operable with various database types. The database types may include, for example, MySQL, HSQL, PostgreSQL database, a Sybase database and an Oracle database. The BPM system may include a database, a BPM process engine, and a database module. The database may have some unique features that are inapplicable to other database types supported by the BPM system. For example, the database may be an Oracle database that supports data types (e.g., longvarchar) not supported by MySQL or HSQL.

The BPM process engine executes business processes and requests database accesses during execution. The database module facilitates database accesses. In particular, the database module receives data requests submitted by the BPM process engine, maps object data contained in these requests to database elements, and submits requests specifying the database elements to the database. The database module may perform mapping using a mapping document that is compiled to include only the database elements recognizable by all databases supported by the BPM system.

In the following description, numerous specific details are set forth such as examples of specific systems, languages, components, etc. in order to provide a thorough understanding of the present invention. It will be apparent, however, to one skilled in the art that these specific details need not be employed to practice the present invention. In other instances, well known materials or methods have not been described in detail in order to avoid unnecessarily obscuring the present invention.

The present invention includes various steps, which will be described below. The steps of the present invention may be performed by hardware components or may be embodied in machine-executable instructions, which may be used to cause a general-purpose or special-purpose processor programmed with the instructions to perform the steps. Alternatively, the steps may be performed by a combination of hardware and software.

The present invention may be provided as a computer program product, or software, that may include a machine-readable storage medium having stored thereon instructions, which may be used to program a computer system (or other electronic devices) to perform a process according to the present invention. A machine-readable storage medium includes any mechanism for storing or transmitting information in a form readable by a machine (e.g., a computer). For example, a machine-readable storage medium (e.g., computer-readable storage medium) includes read only memory ("ROM"), random access memory ("RAM"), magnetic disk storage media, optical storage media, and flash memory devices, etc.

Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

FIG. 1 illustrates an exemplary network architecture 100 in which embodiments of the present invention may operate. The network architecture 100 may include client devices (clients) 106, a BPM system 102 and a network 104. The clients 102 may be, for example, personal computers (PCs), mobile phones, palm-sized computing devices, personal digital assistants (PDAs), etc.

The clients 106 are coupled to the BPM system 102 via the network 104, which may be a public network (e.g., Internet) or a private network (e.g., Ethernet or a local area Network (LAN)). The BPM system 102 may include one or more servers providing BPM functionality. In particular, the BMP system 102 may allow process developers to define business processes using such business process languages as jPDL, BPEL, etc. Clients 106 may host browser applications to present user interfaces for defining business processes to their users. The BPM system 102 may execute business process definitions and provide user interfaces to allow users of clients 106 to interact with execution of business processes, monitor the execution of business processes, and view statistics about business process executions. Users of clients 106 may include, for example, process developers, system administrators, business analysts, etc.

The network architecture 100 may also include application servers 108 hosting applications 110, and/or web servers 112 hosting web services 112. During execution, business processes may interact with applications 110 and/or web services 114 by invoking applications 110 and/or web services 114 or exchanging data with applications 110 and/or web services 114.

While the BPM system 102 operates, it issues numerous database access requests. The BPM system 102 is operable with various database types. These database types may include, for example, databases compliant with Java Database Connectivity (JDBC) such as MySQL, HSQL, PostgreSQL, Sybase, etc. Some of these databases have unique features that are not supported by the other databases. However, the BPM system 102 makes these differences transparent to its users, and allows its customers to choose databases for their BPM system, without requiring the customers to know of any differences the selected database may have with other databases.

Figure 2:
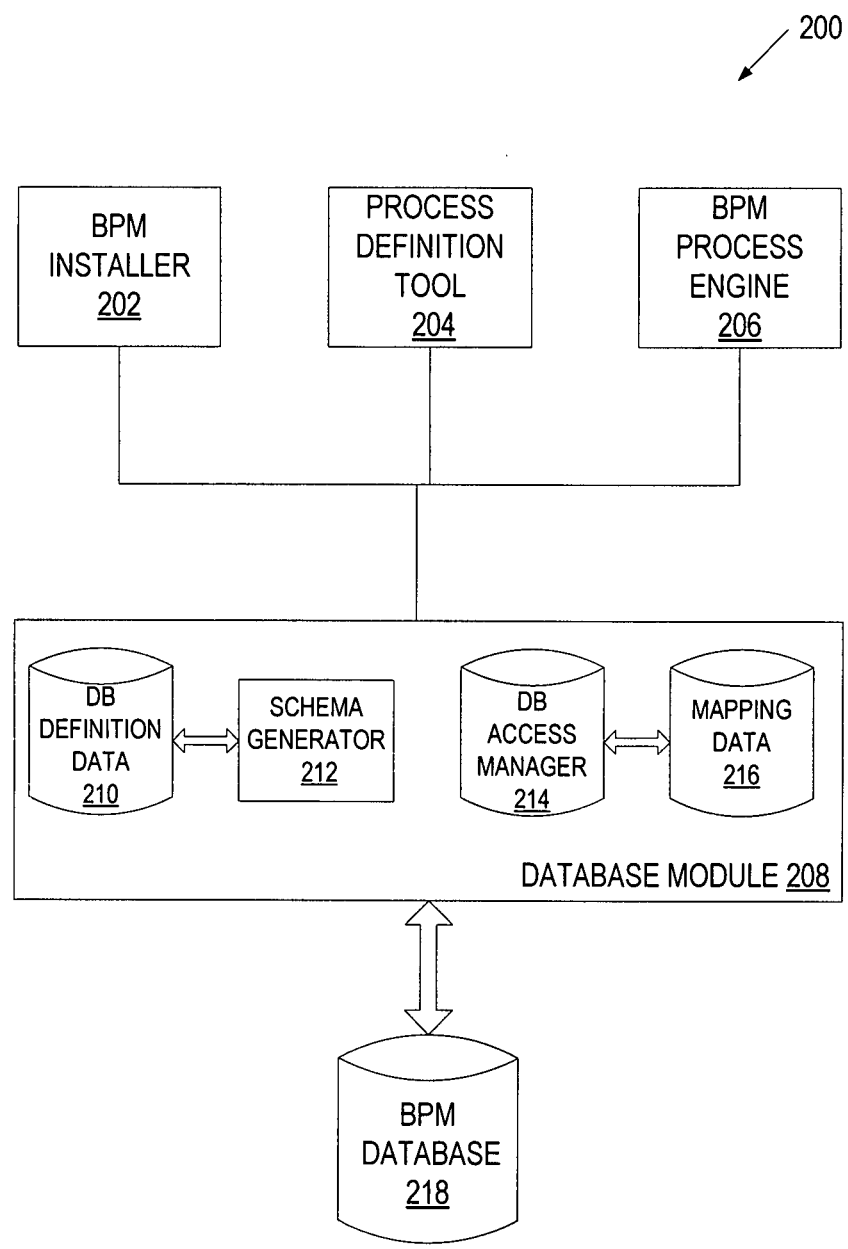
FIG. 2 illustrates a block diagram of one embodiment of a BPM system.

FIG. 2 is a block diagram of one embodiment of a BPM system 200. The BPM system 200 is operable with various database types such as MySQL, HSQL, PostgreSQL, Sybase, Oracle, etc. The BPM system may include a BPM installer 202, a process definition tool 204, a BPM process engine 206, a database module 208, and a database 218. These components may reside on a single machine or on multiple machines.

The BPM installer 202 is responsible for installing the BPM system 200 and invoking the database module 208 to generate a schema for the database 218. The database 218 may be any of the above database types and may have some unique features that are inapplicable to other the database types. For example, the database 218 may be an Oracle database that supports data types (e.g., LONGVARCHAR) not supported by MySQL or HSQL. In another example, the database 218 may be a Sybase database that does not allow a foreign key to have multiple rows with the null value if the foreign key column is specified with a unique constraint, as opposed to the other databases that do not treat multiple null values as a violation of the unique constraint.

The database module 208 includes a schema generator 212 that generates the schema using database definition 210. The database definition 210 may specify tables, table columns, data types and sizes of the columns, and other information. The database definition 210 is common for all database types and includes uniform elements and parameters supported by all database types. For example, because the Oracle database does not support LONGVARCHAR data types, the database definition 210 may use VARCHAR data types instead of LONGVARCHAR data types, with the size of corresponding columns being increased from 255 to 4000.

The process definition module 204 allows users to define business processes (e.g., jPDL or BPEL business processes) and sends the business process definitions to the database module 208 for storage in the database 218. The BPM process engine 206 executes business processes and requests database accesses during execution.

The database module 208 receives data requests from other components of the database module 208 (e.g., the process definition tool 204 and the BPM process engine 206), and invokes a database access manager 214 to map object data contained in these requests to database elements, and to send requests with the resulting database elements to the database 218. The database access manager 214 may perform mapping using mapping data 216 that provides correlation between object data (e.g., Java objects) and database elements, and specifies properties of the database elements. The mapping data 216 is compiled to include database elements and properties that are recognizable by all database types supported by the BPM system. For example, because the Sybase database treats multiple rows with the null value in a foreign key column as duplicates, the mapping data 216 does not impose a unique constrain on a foreign key that can have multiple null values.

Figure 3:
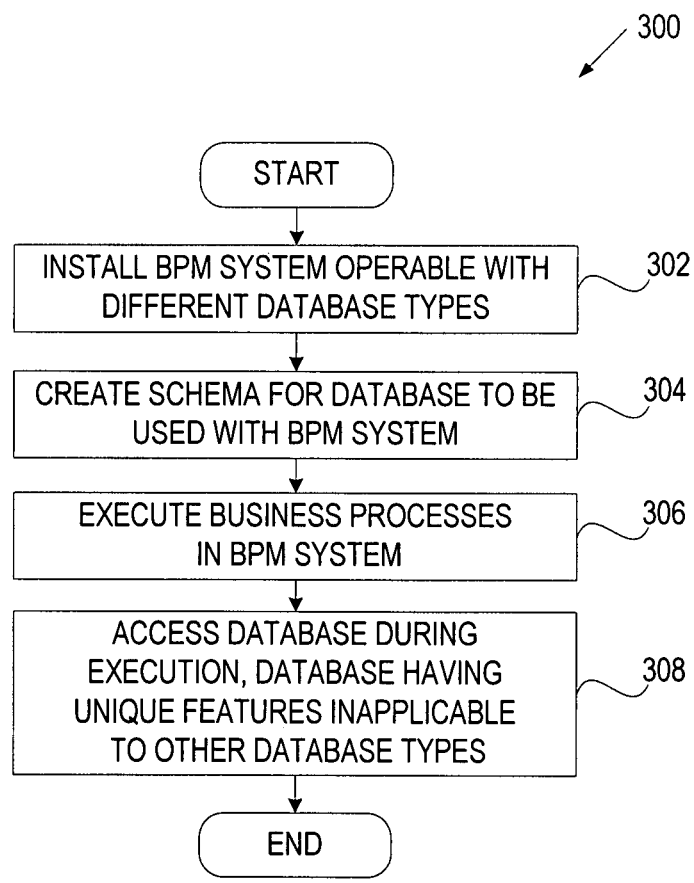
FIG. 3 illustrates a flow diagram of one embodiment of a method for providing BPM interoperability with different databases.

FIG. 3 illustrates a flow diagram of one embodiment of a method 300 for providing BPM interoperability with multiple databases. The method may be performed by processing logic that may comprise hardware (e.g., circuitry, dedicated logic, programmable logic, microcode, etc.), software (such as instructions run on a processing device), or a combination thereof. In one embodiment, method 300 is performed by BPM system 102 of FIG. 1.

Referring to FIG. 3, method 300 begins with processing logic receiving user request to install a BPM system and installing the BPM system (block 302). As discussed above, the BPM system is operable with various databases.

At block 304, processing logic creates a schema for a BPM database that will be used by the BPM system. When creating the schema, processing logic uses database definition data that is uniform for all database types supported by the BPM system. Hence, the user does not need to know or specify the type of the BPM database or its differences with the other databases.

Once the BPM system is installed, processing logic can execute business processes (block 306), and issue requests to access the database as needed during the execution (block 308). As discussed above, the database may have unique features that are inapplicable to the other databases supported by the BPM system. Processing logic does not require the user to specify these differences, and handles the database requests similarly for all database types.

Figure 4:
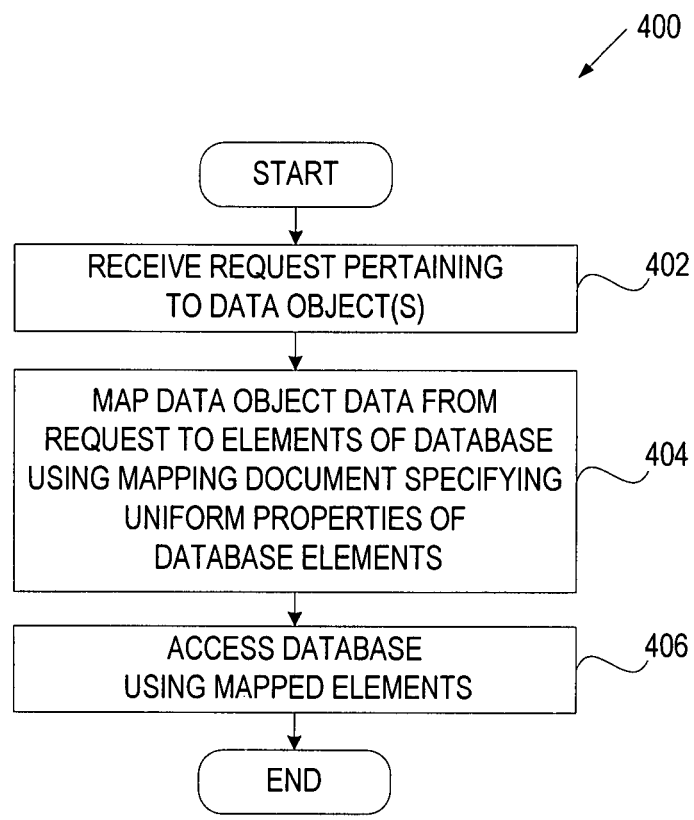
FIG. 4 illustrates a flow diagram of one embodiment of a method for facilitating database access.

FIG. 4 illustrates a flow diagram of one embodiment of a method 400 for facilitating database access. The method may be performed by processing logic that may comprise hardware (e.g., circuitry, dedicated logic, programmable logic, microcode, etc.), software (such as instructions run on a processing device), or a combination thereof. In one embodiment, method 400 is performed by database module 208 of FIG. 2.

Referring to FIG. 4, method 400 begins at block 402 with processing logic receiving a request pertaining to one or more data objects (e.g., Java objects). A request could be generated during the execution of a business process, during the creation of a business process definition, during the creation of a business process deployment package, etc.

At block 404, processing logic maps the data objects from the request to database elements using a mapping document. The mapping document specifies database elements and element properties that are uniform for all databases supported by the BPM system. At block 406, processing logic issues a database request with the mapped elements to the database.

The database performs the request (e.g., by reading, updating or deleting the database elements indicated in the database request) and returns a response. The response may include data retrieved from the database. If so, processing logic maps this data to objects using the mapping document and returns the resulting objects to the requestor.

Figure 5:
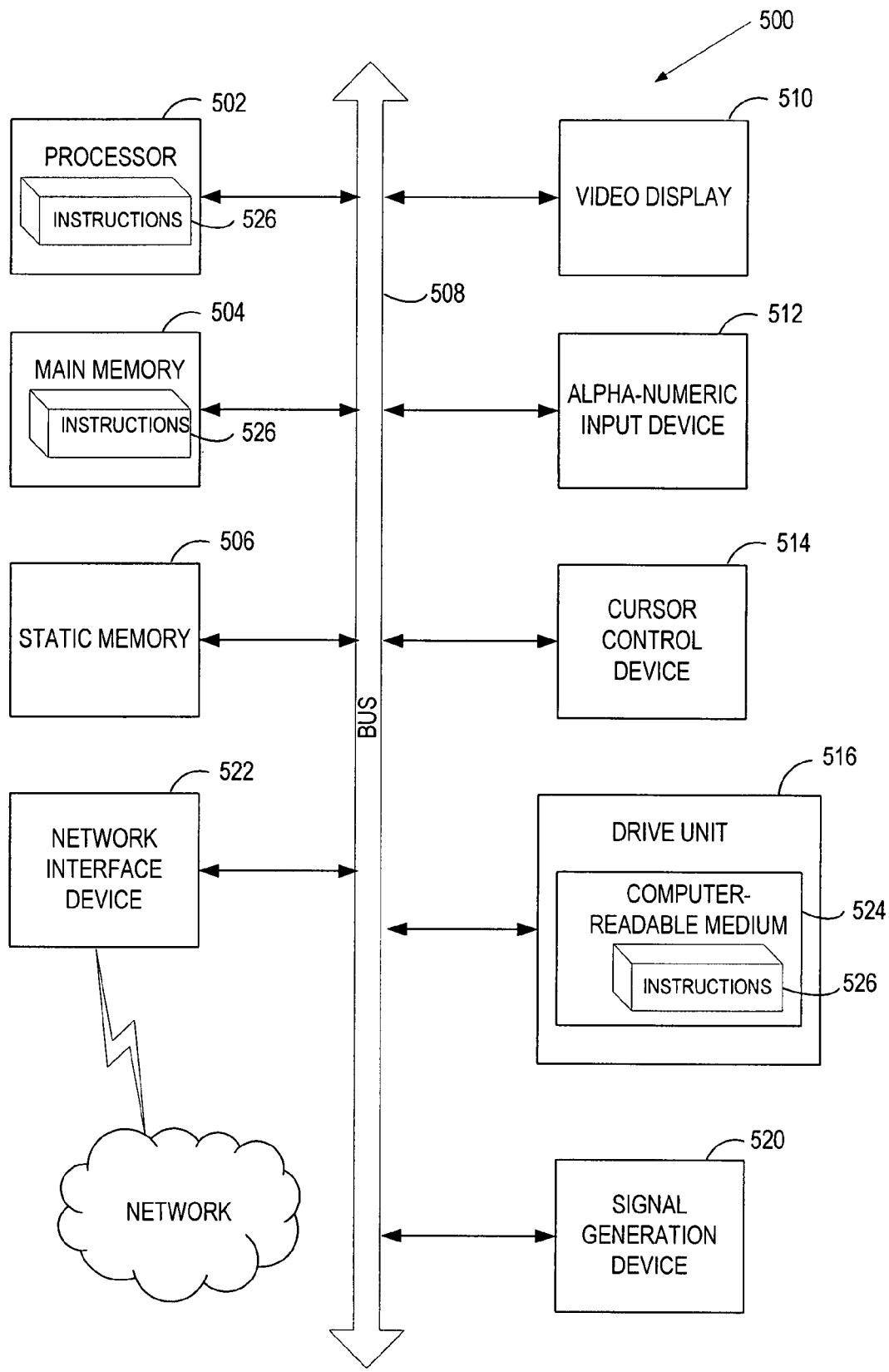
FIG. 5 illustrates a diagrammatic representation of a machine in the exemplary form of a computer system.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. While only a single machine is illustrated, the term "machine" shall also be taken to include any collection of machines that individually or jointly execute a set (or multiple sets) of instructions to perform any one or more of the methodologies discussed herein.

The exemplary computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage device 518, which communicate with each other via a bus 530.

Processing device 502 represents one or more general-purpose processing devices such as a microprocessor, central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. The processing device 502 is configured to execute the processing logic 526 for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The data storage device 518 may include a machine-accessible storage medium 530 on which is stored one or more sets of instructions (e.g., software 522) embodying any one or more of the methodologies or functions described herein. The software 522 may also reside, completely or at least partially, within the main memory 504 and/or within the processing device 502 during execution thereof by the computer system 500, the main memory 504 and the processing device 502 also constituting machine-accessible storage media. The software 522 may further be transmitted or received over a network 520 via the network interface device 508.

While the machine-accessible storage medium 530 is shown in an exemplary embodiment to be a single medium, the term "machine-accessible storage medium" should be taken to include a single medium or multiple media (e.g., a centralized or distributed database and/or associated caches and servers) that store the one or more sets of instructions. The term "machine-accessible storage medium" shall also be taken to include any medium that is capable of storing or encoding a set of instructions for execution by the machine that causes the machine to perform any one or more of the methodologies of the present invention. The term "machine-accessible storage medium" shall accordingly be taken to include, but not be limited to, solid-state machines, and optical and magnetic media.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method, comprising:
presenting a user interface to receive user input specifying a database for a business process management (BPM) system operable with a plurality of database types, the plurality of database types comprising three or more separate database types, wherein the user input specifying the database does not comprise an indication of a database type of the database for the BPM system or differences between the database and other databases of the plurality types;
installing the BPM system, wherein the installing comprises creating a schema for the database using a database definition comprising uniform elements and parameters supported by all of the plurality of database types, the database definition specifying tables, table columns and data types, wherein the data types are recognizable by all of the plurality of database types, each of the plurality of database types having one or more features that are inapplicable to other ones of the plurality of database types;
executing, by a processing device, a definition of a business process using the BPM system, the definition of the business process being expressed in a business process language; and
when executing the definition of business process, accessing, by the BPM system, the database, wherein accessing the database comprises receiving a request pertaining to a data object, mapping, using a mapping document, the data object to a database element in the schema for the database, wherein the mapping document is separate from the database definition and the mapping document specifies database elements and element properties that are uniform for all databases supported by the BPM system, the properties being recognizable by any of the plurality of database types, and performing a database operation for the database element according to the request.

2. The method of claim 1 wherein users of the BPM system are unaware that the database has unique features that are inapplicable to the other database types.

3. The method of claim 1 wherein the plurality of database types comprises two or more of a MySQL database, an HSQL database, a PostgreSQL database, a Sybase database or an Oracle database.

4. The method of claim 1 wherein the one or more business process languages comprise at least one of the business process execution language (BPEL) or Java BPM process definition language (jPDL).

5. A system comprising:
a memory to store instructions for a business process management (BPM) system operable with a plurality of database types, the plurality of database types comprising three or more separate database types;

a processing device, coupled to the memory, to execute the instructions, wherein the instructions cause the processing device to:

present a user interface to receive user input specifying a database for the BPM system, wherein the user interface does not receive an indication of a database type of the database for the BPM system;

installing the BPM system, wherein installing the BPM system comprises creating a schema for a database of one of the plurality of database types using a database definition comprising uniform element and parameters supported by all of the plurality of database types, the database definition specifying tables, table columns and data types, wherein the data types are recognizable by all of the plurality of database types, each of the plurality of database types having one or more features that are inapplicable to other ones of the plurality of database types;

cause a BPM process engine to execute definitions of business processes, the definitions of business processes being expressed in one or more business process languages, and request database access during execution, the BPM process engine operable with the plurality of database types; and receiving a request pertaining to one or more data objects during the execution of the definition of the business process, mapping, using a mapping document, the data objects to database elements in the schema of the database during the execution of the definition of the business process, wherein the mapping document is separate from the database definition and the mapping document specifies database elements and element properties that are uniform for all databases supported by the BPM system, the properties being recognizable by any of the plurality of database types, and performing a database operation for the mapped database elements according to the request during the execution of the definition of the business process.

6. The system of claim 5 wherein the plurality of database types comprises two or more of a MySQL database, an HSQL database, a PostgreSQL database, a Sybase database or an Oracle database.

7. A non-transitory machine-accessible storage medium including instructions that, when executed by a processing device, cause the processing device to perform operations comprising:

providing a business process management (BPM) system operable with a plurality of database types, wherein providing the BPM system comprises:

presenting a user interface to receive user input specifying a database for a business process management (BPM) system operable with a plurality of database types, the plurality of database types comprising three or more separate database types, wherein the user input specifying the database does not comprise an indication of a database type of the database for the BPM system or differences between the database and other databases of the plurality types;

installing the BPM system, wherein the installing comprises creating a schema for the database using a database definition comprising uniform elements and parameters supported by all of the plurality of database types, the database definition specifying tables, table columns and data types, wherein the data types are recognizable by all of the plurality of database types, each of the plurality of database types having one or more features that are inapplicable to other ones of the plurality of database types;

executing, by a processing device, a definition of a business process using the BPM system, the definition of the business process being expressed in a business process language; and when executing the definition of business process, accessing, by the BPM system, the database, wherein accessing the database comprises receiving a request pertaining to a data object, mapping, using a mapping document, the data object to a database element in the schema for the database, wherein the mapping document is separate from the database definition and the mapping document specifies database elements and element properties that are uniform for all databases supported by the BPM system, the properties being recognizable by any of the plurality of database types, and performing a database operation for the mapped database elements according to the request during the execution of the definition of the business process.

8. The machine-accessible storage medium of claim 7 wherein the plurality of database types comprises two or more of a MySQL database, an HSQL database, a PostgreSQL database, a Sybase database or an Oracle database.

* * * * *